United States Patent Office 3,398,152
Patented Aug. 20, 1968

3,398,152
PROCESS FOR THE SYNTHESIS OF YELLOW METHINE DYES CONTAINING THE DICYANOMETHYLIDENE GROUP
David J. Wallace and Max A. Weaver, Kingsport, Tenn., assignors to Eastman Kodak Company, Rochester, N.Y., a corporation of New Jersey
No Drawing. Continuation-in-part of application Ser. No. 257,831, Feb. 12, 1963. This application Mar. 11, 1966, Ser. No. 533,407
6 Claims. (Cl. 260—288)

ABSTRACT OF THE DISCLOSURE

Process for preparing aniline and 1,2,3,4-tetrahydroquinoline compounds containing a dicyanomethylidene group, useful as dyes for hydrophobic textile materials, by condensing cyanoacetamide with a formylaniline or a formyl-1,2,3,4-tetrayhdroquinoline to obtain a carbonyl (cyano)methylidene intermediate and contacting the intermediate with a dialkylamide and phosphorus oxychloride.

---

The invention relates to the preparation of methine compounds and more particularly to the preparation of methine compounds containing a dicyanomethylidene group.

This application is a continuation-in-part of our U.S. patent application Ser. No. 257,831 filed Feb. 12, 1963, now abandoned.

The methine compounds of the invention containing the dicyanomethylidene group have the general formula

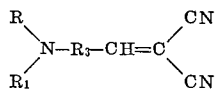

wherein R and $R_1$ each represents a lower alkyl group and $R_3$ represents a monocyclic carbocyclic arylene radical of the benzene series including phenylene and substituted phenylene, and wherein

collectively represents a tetrahydroquinolyl radical.

The methine compounds are particularly useful as dyes and some have previously been prepared by condensation of p-dialkylaminobenzaldehydes with malononitrile, but due in part to the instability and excessive cost of malononitrile, the dyes have been accorded very limited acceptance. The dyes produce fast shades when used for dyeing hydrophobic fibers, yarns, fabrics and films such as those composed of polyesters, cellulose esters and acrylic polymers. For this purpose, the reactions are best selected so as to produce methine dyes free of water-solubilizing groups such as sulfonic acid and carboxylic acid groups.

According to the processes embodied in this invention, lower N,N-dialkylanilines and tetrahydroquinolines are formylated by reaction with lower N,N-dialkylamides of lower aliphatic and aromatic acids in the presence of the inorganic acid halide, phosphorous oxychloride, (such as $PCl_5$, $POCl_3$, $COCl_2$ and $SOCl_2$) according to the reactions below. The resulting formylated compounds are condensed with α-cyanoacetamide to form amides which are dehydrated in the presence of an N,N-dialkylamide and the inorganic acid halide, phosphorous oxychloride, to form the dicyanomethylidene compounds. The sequence of the reactions involved is illustrated in Reaction 2 below. If the process is carried out by reaction of the N,N-dialkylaniline or tetrahydroquinoline with the dialkylamide and acid halide, in the presence of α-cyanoacetamide (Reaction 1), the dicyanomethylidene compound is produced directly through the same sequence of reactions. However, a preferred method is that shown in Reaction 2 where α-cyanoacetamide is not present in the initial reaction mixture. Thus, the formylated N,N-dialkylaniline or tetrahydroquinoline is condensed with α-cyanoacetamide. The condensate is isolated and the amide group thereof is then dehydrated in the presence of the N,N-dialkylamide and phosphorous oxychloride to produce the dicyanomethylidene compound. The reactions involved are believed to be the following.

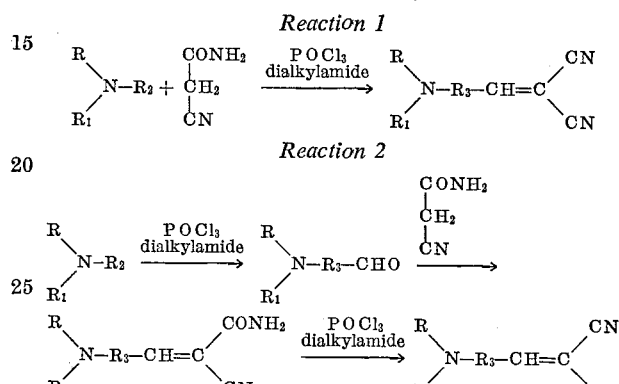

wherein R and $R_1$ are lower alkyl groups straight or branch-chained such as methyl, ethyl, n-propyl and n-butyl including substituted lower alkyl, e.g. β-cyanoethyl and β-chloroethyl, $R_2$ is a tetrahydroquinoline group or a monocyclic carbocyclic aryl group of the benzene series, e.g. phenyl, m-tolyl, 2,7-dimethyl-1,2,3,4-tetrahydroquinoline-6-yl etc. and $R_3$ is an arylene group or tetrahydroquinoline group derived from $R_2$.

Accordingly, in one embodiment of the invention represented by Reaction 1 above, a lower N,N-dialkylaniline or tetrahydroquinoline is reacted with α-cyanoacetamide, a lower N,N-dialkylamide and an inorganic acid halide to form the methine dye directly. According to a preferred embodiment (Reaction 2) the preformed condensate of formula

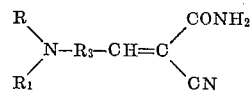

is reacted with an N,N-dialkylamide and the inorganic acid halide $POCl_3$ to form the methine dye. In this process the reaction may be carried out over a wide range of time and temperature, for example, by reaction at 20° C. to about 100° C. for from about 10 to 60 minutes. Thus, good yields are obtained by reaction for 10 minutes at 35° C. or for one hour at 90° C.

When $POCl_3$ is replaced by, for example, $SOCl_2$, $COCl_2$ or $PCl_5$ in the process, poor yields are obtained as shown in the following examples.

The monocyclic carbocyclic arylene group $R_3$ includes unsubstituted phenylene, e.g. p-phenylene and phenylene substituted with a wide variety of substituents which are not especially critical and serve primarily as auxochromes to control the color or shade of the methine compounds and, in some cases, the substantivity of the compounds when used as textile dyes. The substituents, of course, are those not reactive with α-cyanoacetamide or $POCl_3$ in the process. Substituted phenylene groups represented by $R_3$ are alkylphenylene, e.g. o,m-tolylene; alkoxyphenylene, e.g. o,m-methoxyphenylene; halophenylene, e.g. o,m-chlorophenylene; alkylsulfonylphenylene, e.g. o,m-methylsulfonylphenylene; alkylsulfonamidophenylene, e.g. o,m-methylsulfonamidophenylene; di(alkylsulfonyl)phenylene, e.g. 2,5-di-(methylsulfonyl)phenylene; dicarboxylicacidimidophenylene, e.g. o,m-succinimidophenylene; acylamidophenylene, e.g. o,m-acetamidophenylene; benzamidophenylene; thiocyanophenylene, e.g. o,m-thiocyanophenylene; alkylthiophenylene, e.g., o,m - methylthrophenylene; benzoxyphenylene, e.g., o,m - benzoxyphenylene; benzaminophenylene, e.g., o,m - benzaminophenylene; benzylaminophenylene, e.g. o,m-benzylaminophenylene; N-alkylbenzaminophenylene, e.g. o,m-N-phenylmethylaminophenylene; carbalkoxyphenylene, e.g. o,m-carbethoxyphenylene; benzoylphenylene, e.g., o,m,-benzoylphenylene; etc. In some cases these substituents may be attached to the arylene nucleus R₃ after completion of Reaction 2 above.

As suitable N,N-dialkylanilines RR₁—N—R₂ there may be mentioned

N-β-cyanoethyl-N-ethyl-m-toluidine
N,N-diethyl-m-toluidine
N-β-chloroethyl-N-ethyl-m-toluidine
N,N-di-β-cyanoethyl-m-toluidine
N-β-cyanoethyl-N-ethylaniline
N,N-di-β-chloroethylaniline
N,N-diethylaniline
N,N-diethyl-m-chloroaniline Suitable tetrahydroquinolines for use in the processes are:

1,2,3,4-tetrahydroquinoline
2,7-dimethyl-1,2,3,4-tetrahydroquinoline
2,2,4,7-tetramethyl-1,2,3,4-tetrahydroquinoline
2,2,4-trimethyl-1,2,3,4-tetrahydroquinoline
2-methyl-1,2,3,4-tetrahydroquinoline
2-isopropyl-7-methoxy-1,2,3,4-tetrahydroquinoline
1-(2-cyanoethyl)-2,7-dimethyl-1,2,3,4-tetrahydroquinoline
1-(2-cyanoethyl)-1,2,3,4-tetrahydroquinoline
1-(2-cyanoethyl)2,2,4,7-tetramethyl-1,2,3,4-tetrahydroquinoline The lower N,N-dialkylamides used in the process include N,N-dialkylamides of lower aliphatic acids and aromatic acids of the benzene series such as formic, acetic, propionic and butyric acids, the alkyl radicals of which contain 1 to 4 carbon atoms, e.g. N,N-dimethylbenzamide, N,N-dimethyl-m-methylbenzamide, N,N-diethylformamide, N,N-dibutylformamide, N,N-diethylacetamide and N,N-dibutylbenzamide.

A unique feature of the processes of the invention resides in the fact that as shown in Examples 9, 10 and 11, when the inorganic acid halide (POCl₃) is used in absence of the N,N-dialkylamides, the radical

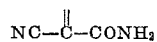

of the N,N-dialkylaniline condensate is not dehydrated and therefore the dicyanomethylidene radical

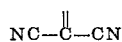

is not formed, whereas according to this invention, when both acid halide and N,N-dialkylamide are present, the N,N-dialkylamide chlorides are formed and the dehydration proceeds smoothly.

The following examples will serve to illustrate the invention.

Example 1

(A) Preparation of 4-(N-β-cyanoethyl-N-ethylamino)-2-methylbenzaldehyde.—To a solution of 94.1 g. of N-β-cyanoethyl-N-ethyl-m-toluidine in 100 ml. of dimethylformamide is added 55 ml. of phosphorous oxychloride, keeping the temperature of the reaction below 25° C. After the addition is complete, the mixture is heated at 90–95° C. for 1½ hours, then drowned in one liter of ice-water mixture. This solution is made basic with 50% aqueous sodium hydroxide solution. A yellow oil comes down, which soon solidifies. The solid is collected, washed with water and air dried. The yield is 97 g., M.P. 55–58° C. Recrystallization from 750 ml. of ethanol gives 77 g., M.P. 60–61° C.

(B) 2.16 g. 4-(N-β-cyanoethyl-N-ethyl)amino-2-methylbenzaldehyde, .84 g. α-cyanoacetamide, 3 drops piperidine and 20 ml. of ethanol is stirred and refluxed five hours. When the reaction is chilled, the dye precipitates. It has the following structure:

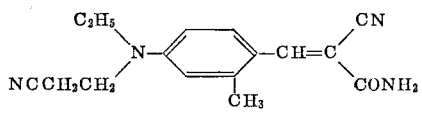

(C) This dye is then reacted as follows: The above product is dissolved in 10 ml. dimethylformamide at 80° C., then 2 ml. phosphorous oxychloride is added at 75–80° C. Heating is continued for 15 minutes. Then 25 ml. methanol is added with stirring. The dye seperates out on cooling. The overall yield for steps B and C is 1.8 g. (70%). The dye has the structure:

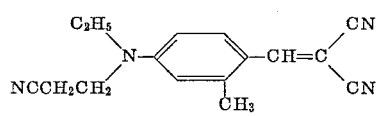

Example 2

19.8 g. N-β-chloroethyl-N-ethyl-m-toluidine is dissolved in 20 ml. dimethylformamide. This solution is treated with 11 ml. phosphorus oxychloride at below 25° C. The reaction is completed and worked up as in Example 1. The yield of aldehyde is 14.1 g., M.P. 47–49° C. Reacted as in Example 1B and 1C, this aldehyde gives a yellow dye of excellent properties for dyeing cellulose acetate, acrylic polymer and polyester fibers.

Example 3

21.3 g. N,N-di-β-cyanoethyl-m-toluidine is treated as described in Example 2 to give a good yield of 4-(N,N-di-β-cyanoethylamino)-2-methylbenzaldehyde. The dye made from this aldehyde as in Example 1 is a yellow dye of excellent properties for dyeing cellulose acetate, acrylic polymer and polyester fibers.

Example 4

87.0 g. N-β-cyanoethyl-N-ethyl-aniline is treated as in Example 1A. After the solution is made basic, the yellow oil obtained is extracted with chloroform and the extract dried. The solvent is removed under vacuum to give 91.0 g. of the aldehyde, which, on reaction further as in Example 1, gives an excellent yellow dye for dyeing cellulose acetate, acrylic polymer and polyester fibers.

Example 5

The dye containing the carboxamide group is made as in Example 1A and 1B. The dehydration is carried out as follows: The above dye is dissolved in five milliliters of phosphorus oxychloride and no dimethylformamide. This solution is heated at 90° C. for 30 minutes. The solution is then poured into a mixture of 75 ml. methanol and 25 ml. water. The mixture is heated to solution, then chilled. The dye, which separates on cooling, has improved dyeing properties over the carboxamide dye used as the starting material. It is not, however, identical with the product from Example 1. Evidence points to a mixture of the starting material and desired product.

Example 6

21.8 g. N,N-di-β-chloroethylaniline is treated as in Example 4 to give the corresponding aldehyde in good yield. When reacted further as in Example 1B and 1C, this aldehyde gives an excellent yellow dye for dyeing cellulose acetate, acrylic polymer and polyester fibers.

Example 7

A dye is prepared as in Example 1A and 1B. The dye is then dissolved in 10 ml. dimethylacetamide at 80° C. and 2 ml. phosphorus oxychloride is added at 75–80° C. Heating at 80° C. is continued for 15 minutes. Then 25 ml. methanol is added with stirring. The dye precipitates on cooling. A good yield of the yellow dye of the structure shown in Example 1 is obtained.

Example 8

The dye is made as in Example 7, using 15 ml. of dimethylbenzamide instead of the dimethylacetamide. The dye, resulting in good yield, is identical with the dye of Example 1.

Example 9.—Attempted preparation of dye with dehydrating agent in absence of N,N-dialkylamide 2.82 g. of the dye as made in Example 1B, 1 ml. phosphorus oxychloride, 10 g. sodium chloride, and 50 ml. ethylene dichloride is refluxed with stirring for eight hours. The mixture is allowed to cool and the solvent decanted. The residue is stirred with 25 ml. water to remove the NaCl. The water is decanted and 20 ml. of ethanol is added. This mixture is heated to reflux, then allowed to cool. A yellow solid is collected. This fraction weighs 0.5 g. and melts at 140–170° C.; the dinitrile melts at 151° C. Chilling the ethylene dichloride fraction gives an impure yellow solid, M.P. 140–160° C. Infrared analysis indicates this fraction to be a mixture. Reference: J.A.C.S. 65, 2471.

Example 10

A mixture of 2.82 g. of the dye made as in Example 1B, 0.83 g. phosphorus pentachloride and 20 ml. 1,2-dibromoethane is refluxed one hour, chilled two hours, filtered, washed with a little methanol and dried in air. Yield: 1.3 g., M.P. 144–180° C. This is predominantly undehydrated amide.

Example 11

A mixture of 2.82 g. of the dye made as in Example 1B, 1.56 g. of $P_2O_5$, and 20 ml. of s-tetrachloroethane is gradually heated to 125° C. and maintained at this temperature for one hour. A sticky product separates. The mixture is cooled and the liquid decanted. All efforts to solidify the product failed.

The above examples clearly show the advantage of employing an N,N-dialkylamide with the acid halides thereby effecting dehydration of the —$CONH_2$ group of the α-cyanoacetamide condensate in the presence of an amide chloride, whereas in absence of the dialkylamides as in Examples 5 and 9–11 the dehydrating agents fail to give the desired results.

Example 12

A solution of 19.5 g. (0.1 mole) of N,N-di-β-hydroxyethyl - m - toluidine in 60 ml. of dimethylformamide is cooled and 30 ml. of phosphorus oxychloride added at less than 50° C. The solution is then heated for three hours on steam bath and poured into approximately 500 ml. of ice-water mixture. The mixture is then made basic with 50% aqueous sodium hydroxide and allowed to stand until the aldehyde has solidified. The solid is filtered, washed with water, and recrystallized from 100 ml. of ethyl alcohol. Yield—18.0 g., M.P. 85–86° C. When this aldehyde is reacted to form a dye as in Example 1B and 1C, a yellow dye results with excellent dyeing and fastness properties on cellulose acetate and polyester fibers.

Example 13

(A) Preparation of 1 - (2 - cyanoethyl) - 2,7 - dimethyl-6-formyl-1,2,3,4,-tetrahydroquinoline.—To a solution of 75.0 g. of 1-(2-cyanoethyl)-2,7-dimethyl-1,2,3,4-tetrahydroquinoline in 70 ml. dimethylformamide is added 35 ml. of phosphorous oxychloride at less than 25° C. The mixture is then heated at 90–95° C. for 1.5 hour and then drowned into 1 liter of ice-water mixture. To this is added 50% aqueous sodium hydroxide until the mixture is strongly basic. The mixture is allowed to stand for two hours at room temperature. The solid is then collected, washed with water, and recrystallized from 400 ml. of ethanol. Yield—54 g., M.P. 119–121° C.

(B) Reaction with α-cyanoacetamide.—2.42 g. of 1-(2-cyanoethyl) - 2,7 - dimethyl - 6 - formyl - 1,2,3,4 - tetrahydroquinoline, 0.84 g. α-cyanoacetamide, 3 drops piperidine, and 25 ml. of ethanol are refluxed together for one hour. The solution is cooled and the solid collected by filtration.

(C) Preparation of the dicyanomethylidene dye.—The amide prepared above is dissolved in 10 ml. of dimethylformamide by heating to 75° C. To this is added 2 ml. phosphorous oxychloride and the heating continued for 15 minutes. The solution is poured into 25 ml. of methanol. The product separates out on cooling and melts at 160–162° C. It has good dyeing properties for cellulose acetate and polyester fibers. This product has the structure:

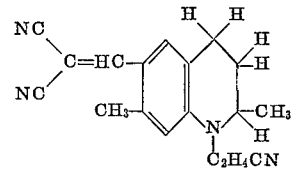

Example 14

(A) Preparation of 1 - (2 - cyanoethyl) - 6 - formyl-1,2,3,4 - tetrahydroquinoline.—A solution of 37.2 g. of 1-(2-cyanoethyl)-1,2,3,4-tetrahydroquinoline in 40 ml. of dimethylformamide is treated with 21 ml. of phosphorus oxychloride at 10–15° C. with stirring and the resulting material heated one hour at 90–95° C. The reaction mixture is poured into 200 ml. of ice-water mixture. To this is added 50% aqueous NaOH solution until the mixture was strongly basic. The product comes down oily, but solidifies rapidly. The solid is collected, washed with water and dried at 60° C., M.P. 72–74° C. Recrystallization from ethanol raises the M.P. to 76.5–77.5° C.

(B) Reaction with α-cyanoacetamide.—4.28 g. 1-(2-cyanoethyl) - 6 - formyl - 1,2,3,4 - tetrahydroquinoline, 1.68 g. α-cyanoacetamide, 2 drops piperidine and 20 ml. of ethanol are refluxed together for 30 minutes. The solution is cooled and the solid collected by filtration and dried at 60° C. Yield—4.50 g., M.P. 189–191° C.

(C) Preparation of the dicyanomethylidene dye.—2.80 g. of the amide prepared in B is dissolved in 10 ml. of dimethylformamide by heating to 70° C. After adding 2 ml. of phosphorous oxychloride, the solution is heated at 70–75° C. for 15 minutes and poured into 25 ml. of methanol. After cooling the solid is collected by filtration and dried in air. Yield—1.5 g., M.P. 135–138° C. The product has good dyeing properties for cellulose ester and polyester fibers.

Example 15

(A) 1 - (2 - cyanoethyl) - 6 - formyl - 1,2,3,4 - tetrahydro - 2,2,4,7 - tetramethylquinoline.—This is prepared by treating 24.2 g. 1-(2-cyanoethyl)-1,2,3,4-tetrahydro-2,2,4,7-tetramethylquinoline with phosphorous oxychloride and dimethylformamide as described in the preceding Example 14A. There is obtained 25.0 g. of aldehyde.

(B) Reaction with α-cyanoacetamide.—5.40 g. of 1-(2-cyanoethyl) - 6 - formyl - 1,2,3,4 - tetrahydro - 2,2,4,7-tetramethylquinoline is reacted with 1.68 g. α-cyanoacetamide as described in Example 14B to yield 4.90 g. of bright orange solid.

(C) Preparation of the dicyanomethylidene dye.—The amide prepared in B (3.36 g.) is treated with phosphorous oxychloride and dimethylformamide as in Example 14C to give 2.0 g. of the dye. The product has good dyeing properties for cellulose esters and polyester fibers.

Example 16

The following process was carried out using two different dehydration complexes:

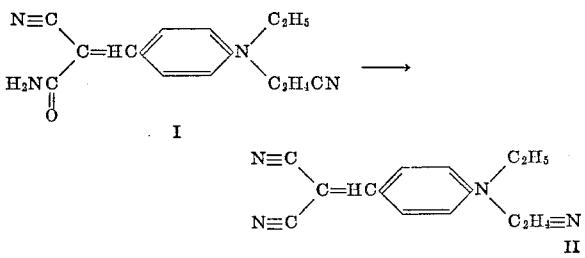

(A) Dimethyl formamide—POCl₃ complex.—A mixture of 0.005 m. of I and 7.5 ml. dimethyl formamide was stirred and 0.005 m. POCl₃ was added dropwise over one minute. The reaction was stirred 10 minutes, then poured into 15 ml. methanol. After standing 20 minutes, the product, II, was filtered off, washed with 5 ml. methanol and dried. Yield—82%, M.P. 151–153° C.

(B) Dimethyl formamide—SOCl₂ complex.—A mixture of 0.005 m. of I and 7.5 ml. dimethyl formamide was stirred and 0.005 m. SOCl₂ was added dropwise over one minute. The reaction was stirred 10 minutes, then poured into 15 ml. methanol. After standing 20 minutes, the product, II, was filtered off, washed with 5 ml. methanol and dried. Yield—55%, M.P. 149–152° C.

The above tests indicate that the use of the dimethyl formamide-POCl₃ complex for the production of Compound II results in obtaining a yield of 82% compared to a yield of 55% when the dimethyl formamide-SOCl₂ complex is used under the same conditions.

Useful results are obtained by carrying out the processes of the invention illustrated above using a fairly wide range of proportion of the reactants. In general, a moderate excess of -cyanoacetamide of the order of 10% based upon the N,N-dialkylaniline may be used. In the processes it is desirable to use one or more of the N,N-dialkylamides in the reaction mixtures as solvents for the N,N-dialkylaniline as well as to facilitate formation of an adequate amount of the amide chloride effective to dehydrate the —CONH₂ group of the condensate.

Inert solvents may also be used in the reaction mixture. Heat can be employed to consummate the reaction as illustrated in the examples and varying temperature and times of heating will be efficacious for different reactants, e.g. it may be expected that the different inorganic acid halides will require different amounts of heating to bring the dehydration reaction to completion.

The compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the compounds of the invention can be used to dye polyester textile materials.

0.1 gram of the dye is dissolved in the dyepot by warming in 5 cc. of ethylene glycol monomethyl ether. A 2% Igepon T (an anionic dispersing agent sold by General Aniline and Film Corp.) and 0.5% sodium lignin sulfonate aqueous solution is added with stirring, until a fine emulsion is obtained. Water is then slowly added to a total volume of 200 cc. 3 cc. of Dacronyx (a chlorinated benzene emulsion formerly available from Onyx Chemical Corp.) are added and 10 g. of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda-ash solution. After scouring, the fabric is rinsed with water and dried. Accordingly, since the methine compounds of the invention are water-insoluble, they can be applied from aqueous dispersions in the manner of the so-called "dispersed dyes." However, coloration can also be effected, for example, by incorporating the compounds into the spinning dope and spinning the fiber as usual. The methine compounds of our invention have varying utility as dyes. The degree of utility varies, for example, depending upon the material being dyed and the formula of the methine compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Unless otherwise indicated, the term "acrylonitrile polymer" as used herein includes polymers consisting essentially of polymerized acrylonitrile (i.e. acrylonitrile polymers containing at least 85% by weight of acrylonitrile) as well as modified acrylonitrile polymers known in the art as modacrylics. The modacrylics contain at least 40% but less than 85% acrylonitrile by weight. The modacrylic fibers disclosed in U.S. Patents 2,811,409, 2,831,826 and 2,843,572, for example, can be dyed with our new monoazo compounds.

The acrylonitrile polymer fibers sold under the trademarks "Verel" and "Orlon" in the form of filaments, yarn and fabric, for example, are illustrative of the acrylonitrile polymer textile materials that can be dyed with our new monoazo compounds.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A process for preparing a methine compound having the formula

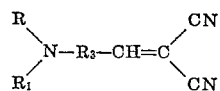

which comprises contacting a compound having the formula

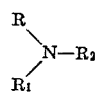

with a lower N,N-dialkylamide, phosphorus oxychloride and cyanoacetamide, wherein R and $R_1$ each is a lower alkyl group, $R_2$ is a monocyclic carbocyclic aryl group, $R^3$ is a monocyclic carbocyclic arylene group, $$R_1-N-R_2$$

taken collectiveely, is a 1,2,3,4-tetrahydroquinolyl group, and

taken collectively, is a 1,2,3,4-tetrahydroquinolylene group.

2. A process for preparing a methine compound having the formula

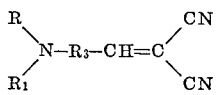

which comprises contacting a compound having the formula

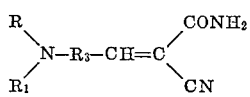

with a lower dialkylamide and phosphorus oxychloride, wherein R and $R_1$ each is a lower alkyl group, $R_3$ is a monocyclic carbocyclic arylene group, and

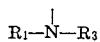

taken collectively, is a 1,2,3,4-tetrahydroquinolylene group.

3. A process according to claim 2 wherein the lower dialkyl amide is a N,N-di-lower-alkylamide of a lower aliphatic acid or a N,N-di-lower-alkylbenzamide and wherein the process is carried out at a temperature of 20° C. to 100° C.

4. A process according to claim 2 wherein the lower dialkylamide is dimethylformamide or dimethylacetamide and wherein the process is carried out at a temperature of 80° C. to 100° C.

5. A process according to claim 2 wherein R is 2-cyanoethyl or 2-chloroethyl, $R_1$ is ethyl or 2-cyanoethyl, and $R_3$ is p-phenylene or p-phenylene substituted with methyl; the lower dialkylamide is dimethylformamide; and wherein the process is carried out at a temperature of 80° C. to 100° C.

6. A process according to claim 2 wherein R is 2-cyanoethyl and

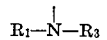

taken collectively is 1,2,3,4-tetrahydroquinolin-1,6-diyl, or 1,2,3,4-tetrahydro-2,2,4,7-tetramethylquinolin-1,6-diyl; the lower dialkylamide is dimethylformamide; and wherein the process is carried out at a temperature of 80° C. and 100° C.

References Cited
UNITED STATES PATENTS

| | | | |
|---|---|---|---|
| 3,141,018 | 7/1964 | Straley et al. | 260—465 X |
| 3,240,783 | 3/1966 | Straley et al. | 260—287 X |
| 3,247,211 | 4/1966 | Weaver et al. | 260—287 |
| 3,300,526 | 1/1967 | Kirsch | 260—465 |

OTHER REFERENCES

Fieser et al., "Advanced Organic Chemistry," Rienhold, 1961, p. 520.

NICHOLAS S. RIZZO, *Primary Examiner.*

D. DAUS, *Assistant Examiner.*